US007987278B2

(12) United States Patent
Regnier

(10) Patent No.: US 7,987,278 B2
(45) Date of Patent: Jul. 26, 2011

(54) WEB SERVICES DEVICE PROFILE ON A MULTI-SERVICE DEVICE: DYNAMIC ADDITION OF SERVICES

(75) Inventor: Alain Regnier, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1177 days.

(21) Appl. No.: 11/641,453

(22) Filed: Dec. 18, 2006

(65) Prior Publication Data

US 2008/0147872 A1    Jun. 19, 2008

(51) Int. Cl.
G06F 15/16    (2006.01)
(52) U.S. Cl. .................................. 709/230; 709/205
(58) Field of Classification Search .............. 709/217, 709/227, 229, 205, 230
See application file for complete search history.

(56) References Cited

U.S. PATENT DOCUMENTS

| | | | |
|---|---|---|---|
| 5,452,452 A | 9/1995 | Gaetner et al. |
| 5,867,735 A | 2/1999 | Zuravleff et al. |
| 6,405,310 B1 | 6/2002 | Simpson |
| 6,421,354 B1 | 7/2002 | Godlewski |
| 6,449,657 B2 | 9/2002 | Stanbach et al. |
| 6,483,805 B1 | 11/2002 | Davies et al. |
| 6,631,407 B1 | 10/2003 | Mukaiyama et al. |
| 6,734,985 B1 | 5/2004 | Ochiai |
| 6,842,898 B1 | 1/2005 | Carlson et al. |
| 7,072,987 B2 | 7/2006 | Jurisch et al. |
| 7,127,700 B2 | 10/2006 | Large |
| 7,191,446 B2 | 3/2007 | Kosanovic |
| 7,373,422 B1 | 5/2008 | Paul et al. |
| 7,430,670 B1 | 9/2008 | Horning et al. |
| 7,433,873 B2 * | 10/2008 | Kang ..................................... 1/1 |
| 7,467,384 B2 | 12/2008 | Brubacher et al. |
| 7,633,644 B2 | 12/2009 | Lum et al. |
| 7,765,248 B2 * | 7/2010 | Kanasaki ....................... 709/203 |
| 7,856,638 B2 | 12/2010 | Kaneda |

(Continued)

FOREIGN PATENT DOCUMENTS

EP    1 809 004 A2    7/2007
KR    2004000697 A    1/2004

OTHER PUBLICATIONS

The Patent Office of the People's Republic of China, "The First Office Action", application No. 200610137667.1, dated Feb. 6, 2009, 7 pages. (Un-translated OA provided as well, 6 pages.).

(Continued)

*Primary Examiner* — Kristie D Shingles
(74) *Attorney, Agent, or Firm* — Hickman Palermo Truong & Becker LLP; Daniel D. Ledesma

(57) ABSTRACT

A technique is provided for implementing multiple Web services on a multi-functional device (MFP) executing multiple service applications. A Device Facility Manager (DFM) executing on the MFP represents the MFP by responding to discovery, metadata, and logging requests with device location, metadata and logging information. When a client application discovers the services provided by the MFP, the client application may communicate directly with a service application executing on the MFP. The client application requests the service metadata of the service application and then transmits SOAP requests, which the service application processes. The implementation of one or more Web Service specifications may be packaged into one common module so that the complexity of the Web Services is hidden from developers. New services may be added to the MFP and existing services may be updated through communication with the DFM.

48 Claims, 5 Drawing Sheets

U.S. PATENT DOCUMENTS

| | | |
|---|---|---|
| 2002/0129110 A1 | 9/2002 | Liu et al. |
| 2003/0110242 A1* | 6/2003 | Brown et al. ............... 709/222 |
| 2003/0187995 A1 | 10/2003 | Fok et al. |
| 2003/0193685 A1 | 10/2003 | Kageyama |
| 2003/0225894 A1* | 12/2003 | Ito ............................... 709/227 |
| 2004/0055002 A1 | 3/2004 | Das |
| 2004/0111506 A1 | 6/2004 | Kundu et al. |
| 2004/0121789 A1 | 6/2004 | Lindsey |
| 2004/0143671 A1 | 7/2004 | Idnani |
| 2004/0226029 A1 | 11/2004 | Gelme |
| 2004/0230500 A1 | 11/2004 | Imago |
| 2004/0236829 A1 | 11/2004 | Xu et al. |
| 2004/0249911 A1 | 12/2004 | Alkhatib et al. |
| 2004/0267876 A1 | 12/2004 | Kakivaya et al. |
| 2005/0021728 A1 | 1/2005 | Sugimoto |
| 2005/0038708 A1 | 2/2005 | Wu |
| 2005/0060431 A1 | 3/2005 | Lewontin |
| 2005/0063003 A1 | 3/2005 | Mishima et al. |
| 2005/0071507 A1 | 3/2005 | Ferlitsch |
| 2005/0086330 A1 | 4/2005 | Perham et al. |
| 2005/0138065 A1 | 6/2005 | Ciriza |
| 2005/0144218 A1 | 6/2005 | Heintz |
| 2005/0182843 A1 | 8/2005 | Reistad et al. |
| 2006/0031395 A1 | 2/2006 | Kumagawa et al. |
| 2006/0031530 A1 | 2/2006 | Iizuka |
| 2006/0077454 A1 | 4/2006 | Lum et al. |
| 2006/0095541 A1 | 5/2006 | Sojian et al. |
| 2006/0117084 A1 | 6/2006 | Morozumi et al. |
| 2006/0158676 A1 | 7/2006 | Hamada |
| 2006/0174026 A1 | 8/2006 | Robinson et al. |
| 2006/0190580 A1 | 8/2006 | Shu et al. |
| 2006/0256392 A1 | 11/2006 | Van Hoof et al. |
| 2007/0073865 A1 | 3/2007 | Motoyama et al. |
| 2007/0083618 A1 | 4/2007 | Kim |
| 2007/0083679 A1 | 4/2007 | Kikuchi |
| 2007/0086430 A1 | 4/2007 | Kemp |
| 2007/0097969 A1 | 5/2007 | Regnier |
| 2007/0220142 A1 | 9/2007 | Moorer et al. |
| 2008/0027988 A1 | 1/2008 | Regnier |
| 2008/0147886 A1 | 6/2008 | Ferlitsch |
| 2009/0271501 A1 | 10/2009 | Shenfield et al. |

OTHER PUBLICATIONS

European Patent Office, "European Search Report", application No. EP 08165235, dated Mar. 25, 2009, 8 pages.

Quiroz, Andres, et al., "Design and Implementation of a Distributed Content-based Notification Broker for WS-Notification", XP-002519356, IEEE, 2006, 8 pages.

Vinoski, Steve, "Web Services Notifications", Toward Integration, XP-002519355, IEEE Computer Society, 2004, 6 pages.

Box, Don, et al., "Web Services Eventing (WS-Eventing)", XP-002519357, Aug. 2004, 38 pages.

Communication from European Patent Office, Application No. 07150058.1-2413 dated May 14, 2008 (5 pages).

Communication received from Application No. 07150058.1 dated Aug. 22, 2008, 18 pages.

Microsoft: "Devices Profile for Web Services" XP002485806 retrieved from the Internet URL: http://specs.xmlsoap.org/ws/2006/02/devprof/devicesprofile.pdf > retrieved on Feb. 1, 2006, 39 pages.

Jammes, Francois et al., "Service oriented device communications using the devices profile for Web services", ACM 2005, 8 pages.

Stal, Michael, "Web Services: beyond component-based computing", ACM Oct. 2002, vol. 45, No. 10, pp. 71-76.

Jammes, F. et al., "Service-Oriented Device Communications Using the *Devices Profile for Web Services*" MPAC (Dec. 2, 2005) 8 pages.

European Communication received in Application No. 07252034.9 dated Nov. 5, 2010 (11 pages).

D1: Ekanayake, J. et al., "Common Architecture for Functional Extensions on Top of Apache Axis 2" XP002455230, Apr. 24, 2006 (6 pages).

D2: Anonymous, "Axis2 Architecture guide" Internet Article, XP002455231, Apr. 7, 2006 (12 pages).

D3: Buschmann, F. et al., "Pattern-Oriented Software Architecture," XP002455240, 1996 (10 pages).

D4: Ivens, K. et al., "Windows 2000: The Complete Reference" 2000, 15 pages.

Hansen, Jennie, "Distributed Largest-First Algorithm for Graph Coloring", Springer-Verlag, Berlin Heidelberg, 2004 8 pages.

Herriot et al., "Internet Printing Protocol (IPP): Event Notifications and Subscriptions", Mar. 2005, Xerox Corp, Request for comments .3995, pp. 1-95.

\* cited by examiner

WEB SERVICES DEVICE PROFILE ON A MULTI-SERVICE DEVICE: DYNAMIC ADDITION OF SERVICES

FIELD OF THE INVENTION

The present invention relates to multi-functional peripherals (MFPs), and more particularly to implementing standard Web service protocols on a device facility manager (DFM) that also maintains device-related information.

RELATED CASES

This application is related to U.S. patent application Ser. No. 11/641,454, entitled WEB SERVICES DEVICE PROFILE ON A MULTI-SERVICE DEVICE: DEVICE AND FACILITY MANAGER, filed on Dec. 18, 2006, the contents of which are herein incorporated by reference in their entirety for all purposes.

This application is related to U.S. patent application Ser. No. 11/497,000, entitled ADVANCED WEB SERVICES ON A LEGACY PLATFORM, filed on Jul. 31, 2006, the contents of which are herein incorporated by reference in their entirety for all purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term "Web services" describes a standardized way of integrating Web-based applications using the XML, SOAP, and WSDL standards over an Internet protocol backbone. XML is used to tag the data, SOAP is used to transfer the data, WSDL is used for describing the services available. Used primarily as a means for businesses to communicate with each other and with clients, Web services allow organizations to communicate data without intimate knowledge of each other's IT systems behind a firewall.

Web services share business logic, data, and processes through a programmatic interface across a network. Web services allow different applications from different sources to communicate with each other without time-consuming custom coding. And, because all communication is in XML, Web services are not tied to any one operating system or programming language. For example, Java can talk with Python and Windows applications can talk with UNIX applications.

Web Services specifications compose together to provide interoperable protocols for Security, Reliable Messaging, and Transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

A multi-functional peripheral (MFP) is a device that performs one or more functions, such as printing, copying, facsimile and scanning. MFPs thus contain increasingly complex logic in order to service requests from multiple clients. Furthermore, adding and updating services on an existing MFP is difficult while not disrupting existing services. Thus, there is a need to simplify the communication between a client and an MFP. There is also a need to simplify the addition of new services to an MFP and to simplify the process of updating existing services.

SUMMARY

A technique is provided for discovering and subscribing to a particular service provided by a multi-functional peripheral (MFP). Location data of an MFP is sent to a client application. A request for metadata of the MFP is received from the client application. The DFM sends, to the client application, device metadata that indicates the plurality of services. The location data may be sent in response to a discovery request from the client application or may be sent as part of a broadcast (or multicast) message on the network to announce the availability of the MFP.

In one approach, the device metadata further indicates where to communicate with the plurality of Web service applications (WSAs) corresponding to the plurality of services provided by the MFP. A WSA receives a SOAP request, from the client application, for service metadata associated with the WSA. The service metadata is sent to the client application after which a SOAP request is received from the client application for the service provided by the WSA.

In one approach, the DFM includes a shared library of library routines that implement one or more functions defined by one or more Web Services specifications. Each WSA may invoke any available library routine from the shared library in order to service SOAP requests from client applications.

In one approach, the DFM includes a Web Services Device (WSD) Manager that comprises information pertaining to the MFP. The information may include service metadata for each service provided by the MFP and device metadata indicating all the services provided by the MFP.

In one approach, the DFM receives service metadata requests from WSAs executing on the MFP. The DFM retrieves service metadata for a corresponding WSA and sends the service metadata to the WSA.

In one approach, the DFM receives configuration information from an administrator. The DFM then configures, or causes to be configured, a particular application based on the configuration information.

Another technique is provided for adding a service to a MFP. An add request is received to add a new application to a device that already provides a service. Code associated with the new application is received. A registration request to register the new application is received from the new application. Service metadata associated with the new service is also received from the new application. A port number is sent to the new application, wherein the new application uses the port number to detect requests for the new service.

In one approach, a service metadata request is received from the new application at the DFM. The DFM retrieves the service metadata associated with the new service and forwards the service metadata to the new application, which forwards the service metadata to a client application.

In one approach, the new application retrieves information pertaining to the device through an abstract API. The abstract API defines an interface by which the new application invokes one or more functions on the device and receives data from the device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview of Device Facility Manager

Figure 1:
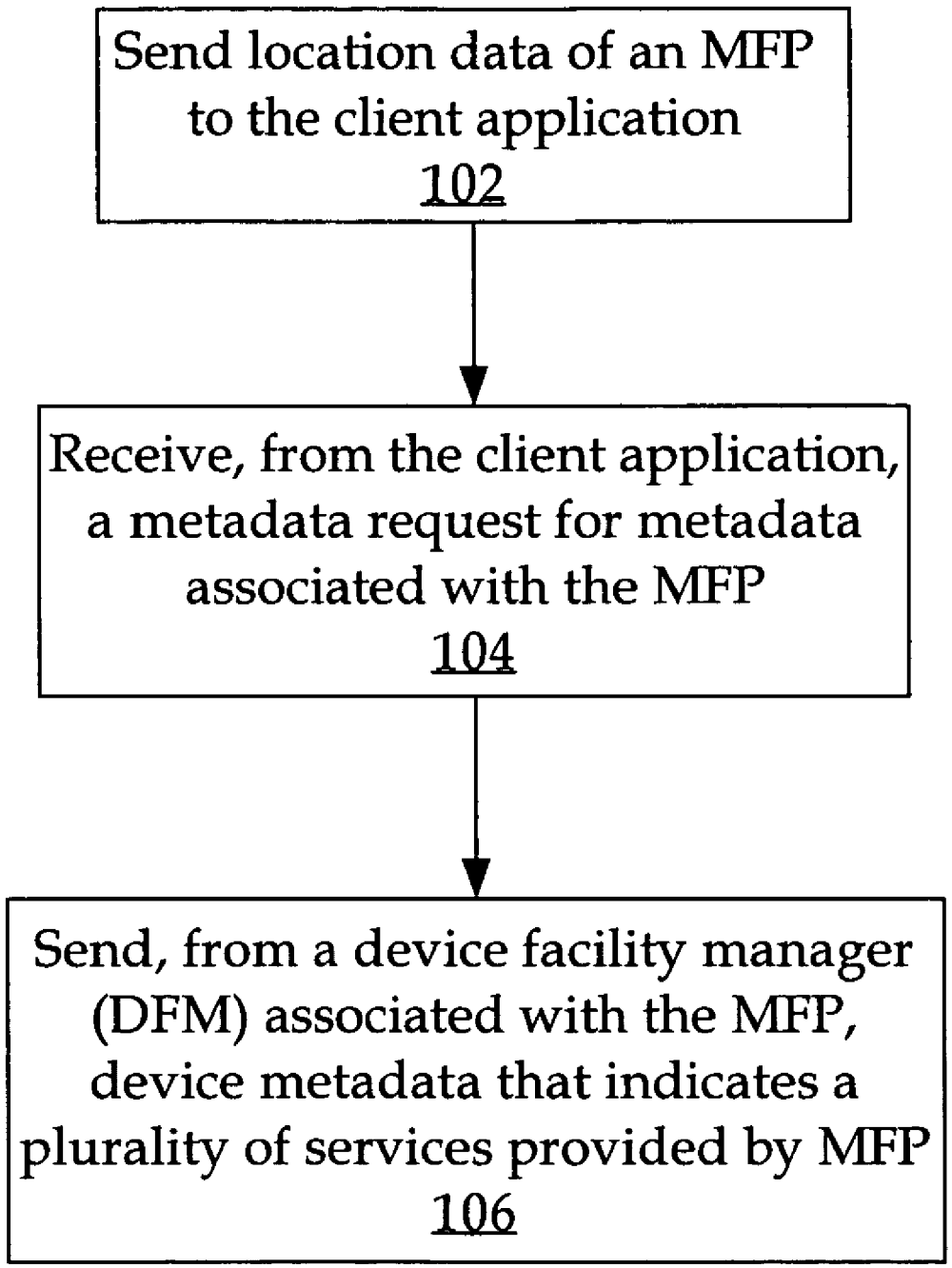
FIG. 1 is a flow diagram that illustrates how a client application may request a Web service provided by an MFP, according to an embodiment of the invention.

FIG. 1 is a flow diagram that illustrates how a client application may request a service from a multi-functional peripheral (MFP), according to an embodiment of the invention. At step 102, location data of the MFP is sent to the client application. At step 104, a device facility manager (DFM) associated with the MFP receives, from the client application, a metadata request for metadata associated with the MFP. At step 106, device metadata is sent from the DFM to the client application, wherein the device metadata indicates a plurality of services provided by the MFP.

Functional Overview of Adding a Service to an MFP

Figure 2:
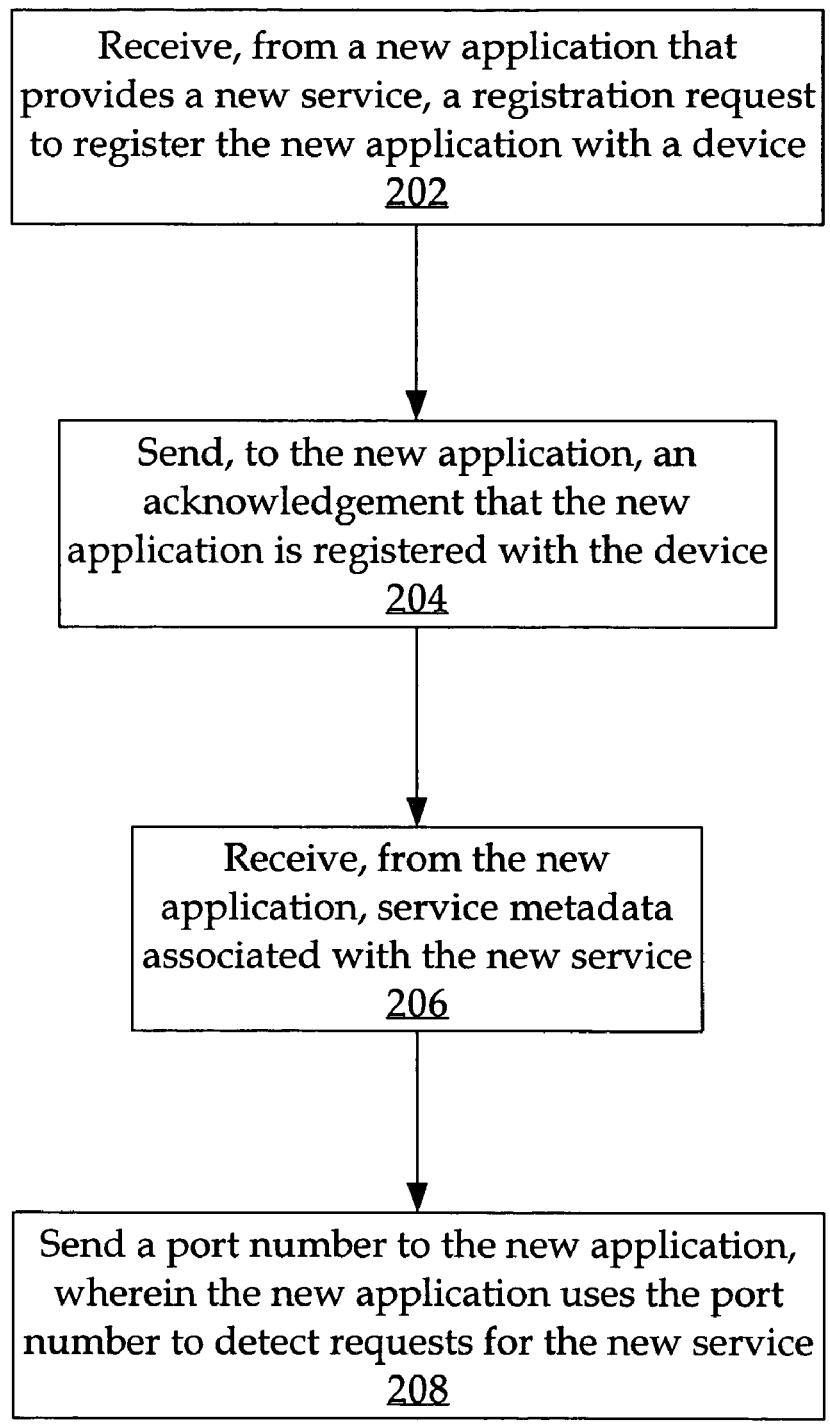
FIG. 2 is a flow diagram that illustrates how a new Web service is added to an MFP, according to an embodiment of the invention.

FIG. 2 is a flow diagram that illustrates how a new Web service is added to an MFP, according to an embodiment of the invention. At step 202, a registration request, to register the new service with a device, is received from a new application that provides a new service. At step 204, an acknowledgment is sent to the new application that the new application is registered with the device. At step 206, service metadata associated with the new service is received from the new application. At step 208, the new application is assigned a port number. The new service application will receive requests, at the port indicated by the port number, for the service provided by the new application.

Architectural Overview

Figure 3:
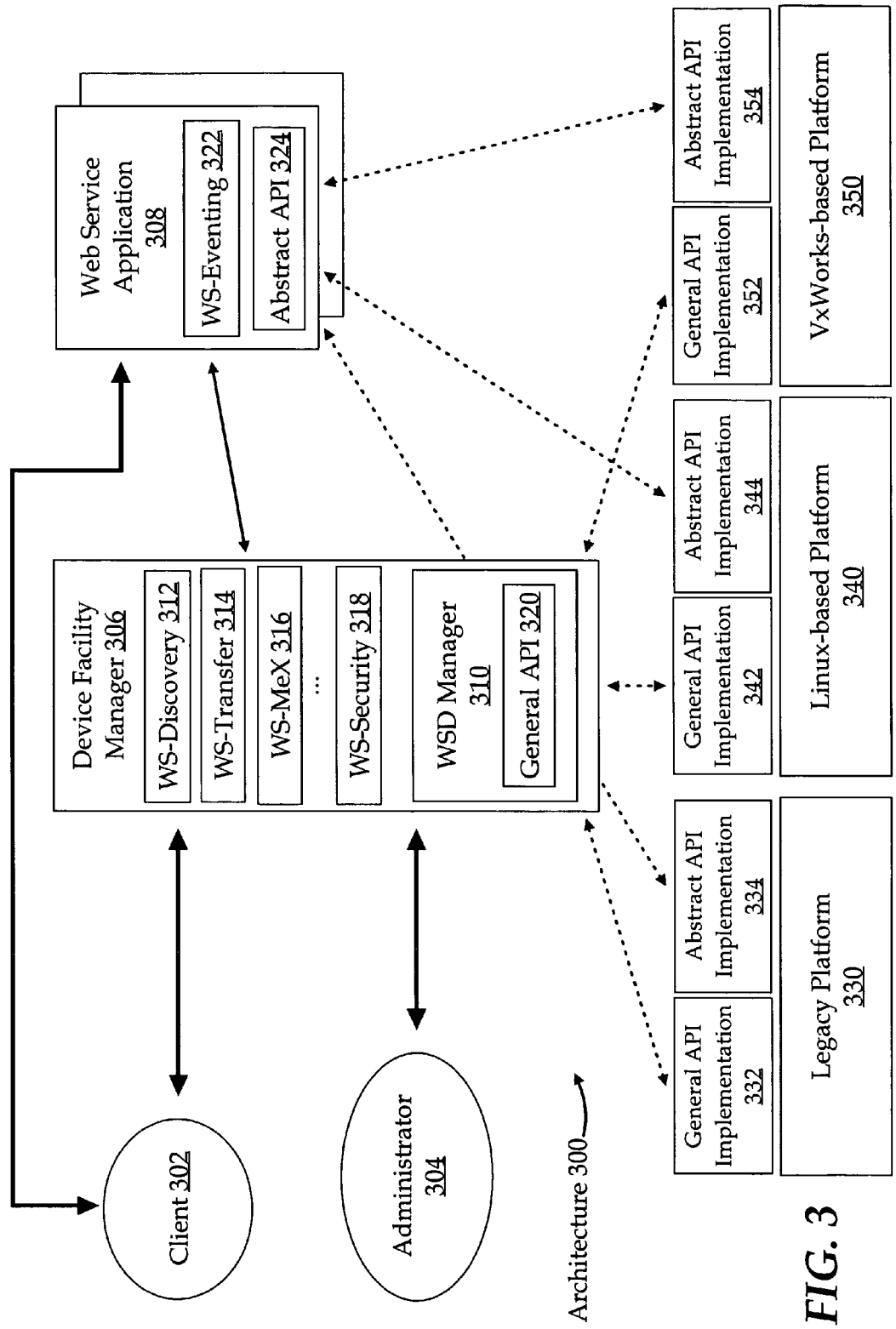
FIG. 3 is a block diagram that illustrates an example architecture 300 for processing requests to process data on MFPs, according to an embodiment of the invention.

FIG. 3 is a block diagram that illustrates an example architecture 300 for processing requests to process data on MFPs, according to an embodiment of the invention. Architecture 300 includes a client 302, an administrator 304, a Device Facility Manager (DFM) 306, and a plurality of Web service applications (WSAs) 308 executing on the MFP.

The MFP, as indicated by FIG. 3, may comprise multiple platforms (e.g. a legacy platform 330, a Linux-based platform 340, and a VxWorks-based platform 350), upon each of which one or more of the WSAs 308 may execute. The platforms depicted in FIG. 3 are merely provided as examples, as the approach is applicable to any type of platform.

DFM 306 represents the MFP by responding to discovery requests, metadata requests from client 302, and configuration and other MFP administration requests from an administrator 304. DFM 306 may act as a repository of implementations of multiple Web Service specifications, such as WS-Discovery 312 and WS-MeX (i.e. WS-MetadataExchange) 316.

Each WSA 308 executing on the MFP provides a service to client 302 that requests the service, e.g. using the SOAP protocol. Each WSA 308 may employ a service specific abstract API, such as abstract API 324, independent from the target platform. Each WSA 308 may also employ WS-Eventing 322.

Client 302 may discover that an MFP exists via a discovery request or a discovery HELLO message (i.e., a broadcast or multicast message announcing the MFP to devices on the same network). Once client 302 is aware of the existence of an MFP, client 302 sends a device metadata exchange request, e.g. via WS-MetadataExchange, to discover all the services that the MFP provides. DFM 306, acting for the entire device, receives the request and returns metadata describing the various services provided by the MFP. Client 302 requests service metadata from a particular service application executing on the MFP, such as Web service application (WSA) 308. WSA 308 may request the service metadata from a Web Service Device (WSD) Manager 310, which returns the service metadata to WSA 308. WSA 308 forwards the service metadata to client 302.

Alternatively, the device metadata of the MFP and the service metadata of one or more WSAs may be sent to client 302 in the same response.

Based on the service metadata, client 302 generates and transmits a SOAP request corresponding to a service provided by WSA 308 which WSA 308 receives and processes. Based on a service request, WSA 308 may use an abstract API 324 to make a platform-specific call to an implementation of abstract API 324, such as an abstract API implementation 344. In this way, a developer of a Web service application (e.g. WSA 308) may focus on the development of the Web service itself and without having to know the complexities of the underlying platform upon which the Web service executes. Therefore, someone other than the Web service application developer with knowledge of the target platform may define the implementation of the corresponding abstract API.

Client

Client 302 is an application that is associated with a process that requests one or more services provided by an MFP. Client 302 is typically an application associated with the operating system that supports the initial requesting process. A purpose of client 302 is to convert a platform-specific procedure call, from a requesting process, to a SOAP request that can be processed by an application that "understands" SOAP.

For example, the requesting process may be associated with a Microsoft Word application and WSA 308 may provide a print service. Client 302 is typically an application associated with the operating system that supports the initial requesting process. Client 302 receives a platform-specific "print data" request sent from the requesting process. Client 302 encodes the print data request in a SOAP message that can be processed by service application 308 that "understands" SOAP messages.

Network

SOAP communication between client 302 and an MFP may be made over a network (not shown). The network may be implemented by any medium or mechanism that provides for the exchange of data between various nodes in the network. Examples of such a network include, without limitation, a network such as a Local Area Network (LAN), Wide Area Network (WAN), Ethernet or the Internet, or one or more terrestrial, satellite, or wireless links. The network may include a combination of networks such as those described. The network may transmit data according to Transmission Control Protocol (TCP), User Datagram Protocol (UDP), and/or Internet Protocol (IP).

Device Facility Manager

DFM 306 represents an MFP by accepting discovery requests, requests for logging information, and configuration instructions. According to an embodiment, DFM 306 also acts as a repository of implementations of multiple Web Service specifications. Thus, DFM 306 includes a shared library of routines that each implement one or more functions defined by one or more Web Services specifications (e.g. WS-Security, WS-MetadataExchange). In this way, multiple Web Service specifications are implemented once and then shared with each of the multiple Web service applications (i.e. WSA 308) executing on the MFP. As a result, developers of Web service applications are not required to know many details about any of the specifications implemented on DFM 306 but can use and rely on those implementations. Some Web Service specifications implemented on DFM 306 may include, but are not limited to, WS-Discovery 312, WS-Transfer 314, WS-MeX (i.e. WS-MetadataExchange) 316, and WS-Security 318.

In one embodiment, DFM 306 includes library routines corresponding to the SOAP protocol. Each SOAP library routine implements one or more functions defined by one or more SOAP specifications. The SOAP library routines are used to analyze SOAP requests and package SOAP messages. Therefore, each WSA 308 may invoke one or more SOAP library routines from DFM 306 so that the SOAP library routines may be defined once and shared among all WSAs 308 executing on the MFP. Multiple versions of the SOAP protocol standard may be supported. Updates to a newer version a SOAP protocol standard may be done with little or no modification to WSA 308.

In one embodiment, a client application (e.g. client 302) may register to receive information pertaining to updates to one or more WSAs on the MFP. If DFM 306 receives update information pertaining to an update of a particular application and a client application is registered to receive a message indicating such update, then DFM 306 sends to the client application a message that indicates the update information.

In one embodiment, DFM 306 may receive update information pertaining to a WSA. For example, WSA 308 may provide a fax service and the MFP detects that the fax line is disconnected. DFM 306 should not respond to future metadata requests with device metadata that indicates that the MFP provides a fax service when the fax service is unavailable. Therefore, DFM 306, in response to receiving update information from a WSA, updates the device and/or service metadata associated with the WSA.

In one embodiment, DFM 306 may receive configuration requests from an administrator application (e.g. administrator 304). A configuration request indicates one or more WSAs that are to be configured and/or updated. The DFM 306 handles configuration requests and performs, or causes to be performed, the configuration or update instruction on the appropriate WSA. Alternatively, as described in more detail below, DFM 306 may instruct WSD Manager 310 to handle such configuration requests.

In one embodiment, DFM 306 may receive and respond to log requests from an administrator application (e.g. administrator 304). DFM 306 retrieves logging information pertaining to the one or more WSAs executing on the MFP and sends the logging information to administrator 304. As described in more detail below, WSD Manager 310 may retrieve and provide to DFM 306 the logging information.

WSD Manager

According to an embodiment, DFM 306 also comprises WSD Manager 310. WSD Manager 310 provides a central point for logging information, status inquiry, and external management of the MFP, such as from an administrator 304. Administrator 304 is an application that is configured to retrieve information pertaining to the MFP through WSD Manager 310. For example, WSD Manager 310 may centralize all logging information coming internally from all WSAs 308 and from the various platforms upon which WSAs 308 are executing. An administrator may also configure, update, or disable a WSA 308 using WSD Manager 310.

In one embodiment, WSD Manager 310 maintains overall status information, such as where the MFP is located, what WSAs are installed on the MFP, and whether the WSAs are running properly.

In one embodiment, WSD Manager 310 maintains the metadata for the MFP and service metadata pertaining to each service application running on the MFP.

General API

According to an embodiment, WSD Manager 310 retrieves general information pertaining to the MFP, such as the IP address and the model number of the MFP, through general API 320. General API 320 defines an interface by which DFM 306 receives information specific to each platform of the MFP. In this way, a DFM developer is not required to know the details of a specific platform, only the details of the DFM that the developer is building for an MFP. (The dotted lines in FIG. 3 are API calls from a particular API to the appropriate API implementation.)

General API Implementation

If general API 320 has been defined for DFM 306, then an implementation of general API 320 for a specific platform must be defined. For example, a general API implementation 332 is defined for general API 320 on a legacy platform 330. Similarly, a general API implementation 342 is defined for general API 320 on a Linux-based platform 340. A corresponding general API implementation defines the functions specified in a device-specific request and implemented on the MFP. Either the developer of DFM 306 may define the implementation or someone else who has knowledge of the target platform may define the implementation.

Web Service Application

Web services application (WSA) 308 is a module that provides one or more Web services and relies on Web Services protocols and technologies, such as those protocols provided by DFM 306. WSA 308 may also rely on a separate SOAP module (not shown) to analyze SOAP requests if WSA 308 does not include logic for analyzing SOAP requests. As indicated above, the separate SOAP module may be provided by DFM 306 and shared among all WSAs 308.

WSA 308 may also comprise a WS-Eventing module 322 for responding to event requests from client 302. Client 302 may subscribe to an event associated with the service provided by WSA 308. For example, WSA 308 may be a printing application and an event that client 302 subscribes to is when the MFP associated with WSA 308 completes a print job. Thus, upon completion of the event, WSA 308 will send an event message to client 302 indicating that the print job is completed.

Abstract API

WSA 308 may also comprise an abstract API (e.g. abstract API 324) through which device-specific calls may be generated. The abstract API defines an interface by which the associated WSA 308 invokes one or more functions on the MFP. Therefore, the developer of a Web service application is not required to know the underlying complexities of the target platform, but only of the new service that the developer aims to provide.

Abstract API Implementation

If an abstract API has been defined by a Web service application developer, then an implementation of the abstract API for a specific platform must be defined. For example, an abstract API implementation 334 is defined for abstract API 324 on GW platform 330. Similarly, an abstract API implementation 354 is defined for abstract API 324 on VxWorks platform 350. A corresponding abstract API implementation defines the functions specified in a device-specific request and implemented on the MFP. Either the developer of the Web service application may define the implementation or someone else who has knowledge of the target platform may define the implementation.

Example of Discovering Services and Processing a Service Request

Figure 4:
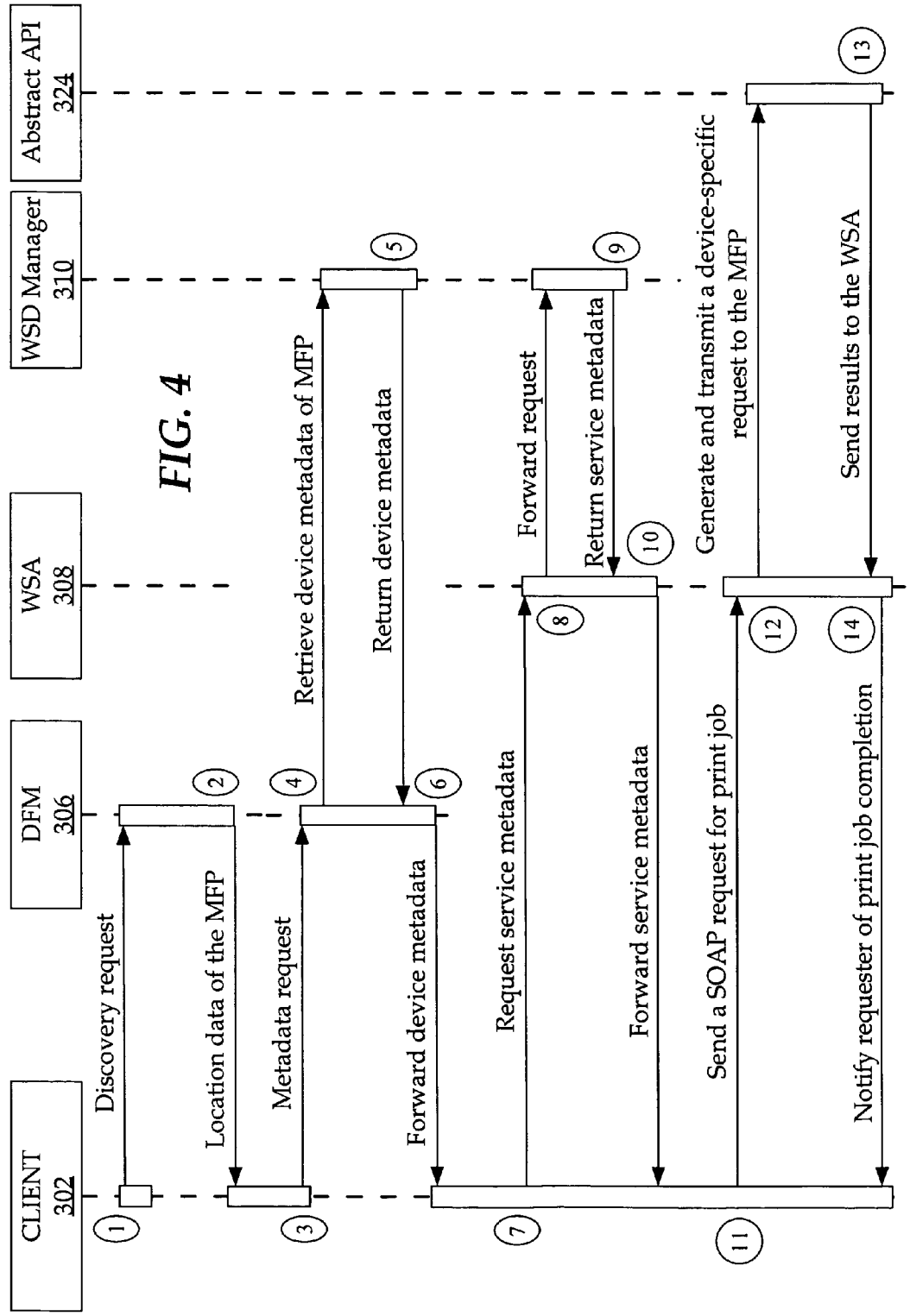
FIG. 4 is a sequence diagram illustrating the communications between a client application and various components of the example architecture for discovering and subscribing to a service provided by an MFP, according to an embodiment of the invention.

FIG. 4 illustrates an example of how client 302 may a) discover services provided by an MFP and b) send a service request. A user arrives at a building and desires to print an electronic document before a meeting, but does not know where any available printing devices are located, especially ones that are configured to handle SOAP requests and implement standard Web Service protocols. The user desires the electronic document to be encrypted and desires to receive a notification when the print job is fully executed (i.e. the entire electronic document is printed).

At step 1, the user sends, via client 302, a multicast discovery request to discover available printing devices that are capable of processing print jobs according to the above requirements. Typically, the discovery request conforms to SOAP or any other platform-independent communication protocol so that devices executing on various platforms may communicate with each other. The discovery request may be generated and transmitted by an application, e.g., a word processing program or email program. In response to the discovery request, DFM 306 may use WS-Discovery 312 to examine the discovery request. WS-Discovery 312 implements the Web Services Discovery protocol standard. DFM 306 also uses WS-Discovery 312 to package a response, which at least includes the IP address of the MFP, and sends the IP address to client 302 (step 2). Alternatively, DFM 306 may be configured to include in the response device metadata, associated with the MFP, identifying the various services provided thereon.

In one embodiment, DFM 306 may broadcast SOAP messages notifying devices in the vicinity that the MFP associated with DFM 306 is available to provide services. In response to such a SOAP message, client 302 may promptly request the device metadata of DFM 306 using the IP address in the initial SOAP message.

At step 3, client 302 sends a request for metadata to DFM 306. A metadata request from client 302 may be initially processed by module WS-Transfer 314 on DFM 306, wherein WS-Transfer 314 comprises one or more routines that implement one or more functions defined by the Web Services Transfer specification. At steps 4 and 5, DFM 306 queries and retrieves from WSD Manager 310 the device metadata associated with the MFP. DFM 306 utilizes module WS-MeX 316 to package the device metadata. Module WS-MeX 316 comprises one or more library routines that implement one or more functions defined by the Web Services MetadataExchange specification. At step 6, DFM 306 uses one or more library routines provided by WS-Transfer 314 to return the device metadata of the MFP to client 302. The device metadata response may include, but is not limited to, a) the physical location of the MFP, b) the MFP's hosting relationship (i.e. list of all services on the MFP), and c) one or more URIs that allows a user to access the one or more services provided by the MFP.

Based on the device metadata, the user of client 302 determines 1) that the MFP provides at least a printing service and 2) the URI to use to access the printing service. In order to communicate directly with the printing service and to discover the exact capabilities of the printing service (e.g. the security provided thereon), client 302 sends a service metadata request to the MFP using the port number provided in the device metadata response (step 7). If WSA 308 provides the printing service, then WSA 308 receives the service metadata request. At step 8, WSA 308 requests the service metadata from DFM 306, which may query WSD Manager 310 for the service metadata associated with WSA 308. WSA 308 receives the service metadata (step 9) and forwards the service metadata to client 302 (step 10). The service metadata may be in the form of a WSDL document that describes the public interface to WSA 308. Thus, the service metadata indicates how client 302 is to interact with WSA 308.

If the user determines, based on the service metadata, that WSA 308 provides the level of printing service that the user requires, the user may require client 302 to register with an eventing service provided by WSA 308. In this example, client 302 requests notification data when the print job is fully executed.

Client 302 receives a platform-specific request from the word processing application on the user's computer to print the electronic document according to the stated requirements. Client 302 transforms the platform-specific request into a SOAP request that can be processed by Web service applications. At step 11, client 302 transmits the SOAP request to WSA 308, which may call DFM 306 to implement some of the policies specified in the SOAP request.

In this example, module WS-Security 318 implements the Web Service Security protocol standard to decrypt the portion of the SOAP request corresponding to the encrypted electronic document. WSA 308 receives the decrypted electronic document from DFM 306. At step 12, using abstract API 324, WSA 308 makes a WSA-specific API call to the specific platform upon which WSA 308 is executing. In this example, the abstract API call is to print the electronic document. At step 13, results of the print job are sent to the WSA 308. At step 14, when the print job is complete, WSA 308 notifies client 302 via WS-Eventing 322.

Some benefits that may result from implementing a DFM as disclosed herein include a) centralized implementation of common Web Services specifications so that all WSAs may benefit and share therefrom, b) a single location for device configuration, metadata handling, and discovery requests, and c) a WSD Manager for centralized control and management of the MFP.

Example of Adding a New Service to an MFP

As an example of how a new service may be added to a device, consider the following. Suppose an archiving service is to be added to an MFP already providing a copying service and a printing service. An owner of the MFP inserts a secure digital (SD) card containing code to the new archiving application. In one embodiment, the code is sent to the MFP from a remote computer using a secure Internet connection. However, any mechanism may be used to provide the code to the MFP. The invention is not limited to any particular manner in which the code for a new application is sent to and received by the MFP.

The code is uploaded to the MFP, after which the MFP executes at least a portion of the code. Execution of at least a portion of the code causes the archiving application to issue a registration request to register the archiving application.

If the MFP already provides an archiving service (and, for example, the existing archiving service is a newer version than the service provided by the new application), then the MFP may deny the registration request and not register the new application with the MFP. However, the MFP may accept an older version of the archiving service in order to provide the archiving service to client applications that are only capable of communicating with the older version.

If the MFP accepts the registration request, then the archiving application sends service metadata associated with the new archiving service to the MFP. The MFP sends a port number to the archiving application. The port number indicates which port of the MFP to "listen" for SOAP requests for the archiving service.

In a similar manner, an existing WSA on the MFP may be updated. The described approach for adding a new service and updating an existing service allow the MFP to continue functioning without being shut down when a service is added or updated.

Once a new application is registered with a device, the new application may receive service metadata requests and respond to other SOAP requests from a client application, as described above.

In one embodiment, once the new application is registered, the MFP or new application may broadcast or multicast a HELLO message to notify devices on the network that the new service is added to the network and ready to respond to service requests.

In one embodiment, once the new application is registered, the device metadata of the MFP is updated to include the new service. The MFP may update the device metadata by informing the WSD Manager of the new application and a URI, which URI a client application may use to send SOAP requests to the new application.

Implementation Mechanisms

Figure 5:
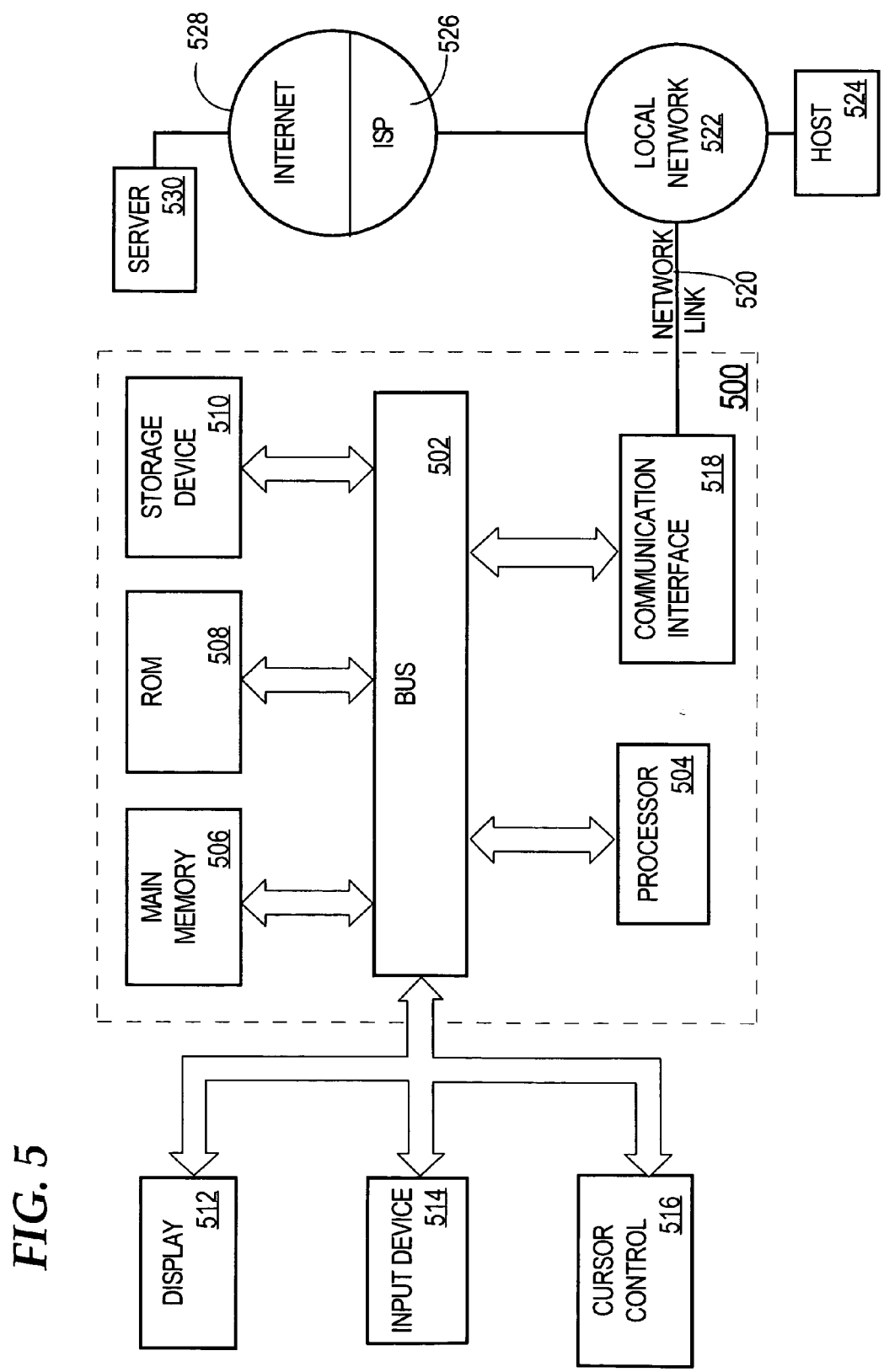
FIG. 5 is a block diagram that illustrates a computer system upon which an embodiment of the invention may be implemented.

The approach described herein may be implemented on any type of computing platform or architecture. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for the dynamic addition of new services to a device, comprising:
    receiving, at the device, code associated with a new application;
    receiving, within the device, from the new application executing on the device, a registration request to register the new application with the device, wherein the new application provides a new service that was not previously hosted by the device;
    sending, within the device to the new application executing on the device, an acknowledgement that the new application is registered with the device;
    receiving, within the device, from the new application executing on the device, service metadata associated with the new service, wherein the service metadata indicates how a client is to interact with the new application; and
    sending a port number from within the device to the new application executing on the device, wherein the new application executing on the device:
        uses the port number to begin detecting requests for the new service;
        receives a SOAP request from a client application that executes on a client device that is separate from said device;
        generates, based on the SOAP request, a device-specific request that conforms to a communications protocol supported by the device; and
        transmits the device-specific request to the device.

2. The method of claim 1, wherein the device includes at least a print process for processing print data and causing a printed version of an electronic document reflected in the print data to be generated.

3. The method of claim 1, further comprising after receiving, within the device, the service metadata from the new application, sending a message from the device to clients on a network, to which the device is connected, indicating the addition of the new service to the device.

4. The method of claim 1, further comprising the new application:
    receiving a service metadata request from a client;
    sending a particular request, based on the service metadata request, to a device facility manager (DFM) executing on and associated with the device;
    receiving, from the DFM, the service metadata associated with the new service; and
    forwarding the service metadata to the client.

5. The method of claim 1, further comprising:
    receiving, at a device facility manager (DFM) executing on and associated with the device, update information from the new application, wherein the update information pertains to the service metadata associated with the new application; and
    based on the update information, updating, within the device, the service metadata associated with the new application.

6. The method of claim 5, wherein the service metadata is updated without restarting the device.

7. The method of claim 1, further comprising:
receiving, within the device, from the new application, logging information pertaining to the number and type of device-specific requests transmitted to the device; and
forwarding the logging information to an administrator application associated with the device.

8. The method of claim 1, wherein:
the new application receives a SOAP request, from a client application, that indicates a request to receive notification data upon the occurrence of a particular event associated with the new application; and
upon occurrence of the particular event, the new application sends the notification data to the client application.

9. The method of claim 1, wherein:
the SOAP request includes a portion corresponding to a Web Services specification;
the new application invokes a library routine from a shared library on a device facility manager (DFM) executing on and associated with the device;
the library routine implements one or more functions defined by the Web Services specification; and
results from executing the library routine are used to generate the device-specific request.

10. The method of claim 1, wherein the new application is added to the device without restarting the device.

11. The method of claim 1,
wherein receiving the code associated with the new application includes receiving the code from a secure digital (SD) memory card that is inserted into the device.

12. The method of claim 1,
wherein receiving the code associated with the new application includes receiving the code from a node on a network to which the device is connected.

13. The method of claim 1, wherein a device facility manager (DFM) executing on and associated with the device performs:
the receiving the registration request to register the new application;
the receiving the service metadata associated with the new service; and
the sending the port number to the new application.

14. The method of claim 1,
wherein the code includes an abstract implementation for a particular platform of the device.

15. The method of claim 1, wherein:
the new application retrieves information pertaining to the device through an abstract API; and
the abstract API defines an interface by which the new application invokes one or more functions on the device and receives data from the device.

16. The method of claim 1, further comprising updating, based on the new application, device metadata of the device, wherein the device metadata indicates all the services, including the new service, hosted by the device.

17. A non-transitory machine-readable medium for the dynamic addition of new services to a device, the machine-readable medium storing instructions which, when processed by one or more processors, causes:
receiving, at the device, code associated with a new application;
receiving, within the device, from the new application executing on the device, a registration request to register the new application with the device, wherein the new application provides a new service that was not previously hosted by the device;
sending, within the device to the new application executing on the device, an acknowledgement that the new application is registered with the device;
receiving, within the device, from the new application executing on the device, service metadata associated with the new service, wherein the service metadata indicates how a client is to interact with the new application; and
sending a port number from within the device to the new application executing on the device, wherein the new application executing on the device:
uses the port number to begin detecting requests for the new service;
receives a SOAP request from a client application that executes on a client device that is separate from said device;
generates, based on the SOAP request, a device-specific request that conforms to a communications protocol supported by the device; and
transmits the device-specific request to the device.

18. The machine-readable medium of claim 17, wherein the device includes at least a print process for processing print data and causing a printed version of an electronic document reflected in the print data to be generated.

19. The machine-readable medium of claim 17, wherein the instructions, when processed by the one or more processors, further cause, after receiving, within the device, the service metadata from the new application, sending a message from the device to clients on a network, to which the device is connected, indicating the addition of the new service to the device.

20. The machine-readable medium of claim 17, wherein the instructions, when processed by the one or more processors, further cause the new application to:
receive a service metadata request from a client;
send a particular request, based on the service metadata request, to a device facility manager (DFM) executing on and associated with the device;
receive, from the DFM, the service metadata associated with the new service; and
forward the service metadata to the client.

21. The machine-readable medium of claim 17, wherein the instructions, when processed by the one or more processors, further cause:
receiving, at a device facility manager (DFM) executing on and associated with the device, update information from the new application, wherein the update information pertains to the service metadata associated with the new application; and
based on the update information, updating, within the device, the service metadata associated with the new application.

22. The machine-readable medium of claim 21, wherein the service metadata is updated without restarting the device.

23. The machine-readable medium of claim 17, wherein the instructions, when processed by the one or more processors, further cause:
receiving, within the device, from the new application, logging information pertaining to the number and type of device-specific requests transmitted to the device; and
forwarding the logging information to an administrator application associated with the device.

24. The machine-readable medium of claim 17, wherein:
the new application receives a SOAP request, from a client application, that indicates a request to receive notification data upon the occurrence of a particular event associated with the new application; and upon occurrence of the particular event, the new application sends the notification data to the client application.

25. The machine-readable medium of claim 17, wherein:
the SOAP request includes a portion corresponding to a Web Services specification;
the new application invokes a library routine from a shared library on a device facility manager (DFM) executing on and associated with the device;
the library routine implements one or more functions defined by the Web Services specification; and
results from executing the library routine are used to generate the device-specific request.

26. The machine-readable medium of claim 17, wherein the new application is added to the device without restarting the device.

27. The machine-readable medium of claim 17, wherein:
receiving the code associated with the new application includes receiving the code from a secure digital (SD) memory card that is inserted into the device.

28. The machine-readable medium of claim 17, wherein:
receiving the code associated with the new application includes receiving the code from a node on a network to which the device is connected.

29. The machine-readable medium of claim 17, wherein a device facility manager (DFM) executing on and associated with the device performs:
the receiving the registration request to register the new application;
the receiving the service metadata associated with the new service; and
the sending the port number to the new application.

30. The machine-readable medium of claim 17, wherein:
the code includes an abstract implementation for a particular platform of the device.

31. The machine-readable medium of claim 17, wherein:
the new application retrieves information pertaining to the device through an abstract API; and
the abstract API defines an interface by which the new application invokes one or more functions on the device and receives data from the device.

32. The machine-readable medium of claim 17, wherein the instructions, when processed by the one or more processors, further cause updating, based on the new application, device metadata of the device, wherein the device metadata indicates all the services, including the new service, hosted by the device.

33. A device for the dynamic addition of new services to a device, the device being configured to:
receive, at the device, code associated with a new application;
receive, within the device, from the new application executing on the device, a registration request to register the new application with the device, wherein the new application provides a new service that was not previously hosted by the device;
send, within the device, to the new application executing on the device, an acknowledgement that the new application is registered with the device;
receive, within the device, from the new application executing on the device, service metadata associated with the new service, wherein the service metadata indicates how a client is to interact with the new application; and
send a port number from within the device to the new application executing on the device, wherein the new application executing on the device:
uses the port number to begin detecting requests for the new service;
receives a SOAP request from a client application that executes on a client device that is separate from said device;
generates, based on the SOAP request, a device-specific request that conforms to a communications protocol supported by the device; and
transmits the device-specific request to the device.

34. The device of claim 33, wherein the device includes at least a print process for processing print data and causing a printed version of an electronic document reflected in the print data to be generated.

35. The device of claim 33, being further configured to, after receiving, within the device, the service metadata from the new application, send a message from the device to clients on a network, to which the device is connected, wherein the message indicates the addition of the new application to the device.

36. The device of claim 33, wherein the new application is configured to:
receive a service metadata request from a client;
send a particular request, based on the service metadata request, to a device facility manager (DFM) executing on and associated with the device;
receive, from the DFM, the service metadata associated with the new service; and
forward the service metadata to the client.

37. The device of claim 33, being further configured to:
receive, at a device facility manager (DFM) executing on and associated with the device, update information from the new application, wherein the update information pertains to the service metadata associated with the new application; and
based on the update information, update, within the device, the service metadata associated with the new application.

38. The device of claim 37, wherein the service metadata is updated without restarting the device.

39. The device of claim 33, being further configured to:
receive, within the device, from the new application, logging information pertaining to the number and type of device-specific requests transmitted to the device; and
forward the logging information to an administrator application associated with the device.

40. The device of claim 33, wherein:
the new application receives a SOAP request, from a client application, that indicates a request to receive notification data upon the occurrence of a particular event associated with the new application; and
upon occurrence of the particular event, the new application sends the notification data to the client application.

41. The device of claim 33, wherein:
the SOAP request includes a portion corresponding to a Web Services specification;
the new application invokes a library routine from a shared library on a device facility manager (DFM) executing on and associated with the device;
the library routine implements one or more functions defined by the Web Services specification; and
results from executing the library routine are used to generate the device-specific request.

42. The device of claim 33, wherein the new application is added to the device without restarting the device.

43. The device of claim 33,
wherein receiving the code associated with the new application includes receiving the code from a secure digital (SD) memory card that is inserted into the device.

44. The device of claim 33,
wherein receiving the code associated with the new application includes receiving the code from a node on a network to which the device is connected.

45. The device of claim 33, wherein a device facility manager (DFM) executing on and associated with the device:
receives the registration request to register the new application;
receives the service metadata associated with the new service; and
sends the port number to the new application.

46. The device of claim 33,
wherein the code includes an abstract implementation for a particular platform of the device.

47. The device of claim 33, wherein:
the new application retrieves information pertaining to the device through an abstract API; and
the abstract API defines an interface by which the new application invokes one or more functions on the device and receives data from the device.

48. The device of claim 33, being further configured to update, based on the new application, device metadata of the device, wherein the device metadata indicates all the services, including the new service, hosted by the device.

* * * * *